United States Patent [19]

Ueda et al.

[11] Patent Number: 5,447,016
[45] Date of Patent: Sep. 5, 1995

[54] PACKAGING MACHINE

[75] Inventors: Michio Ueda; Yoji Nishio; Takeshi Sugiyama, all of Tokushima, Japan

[73] Assignee: Shikoku Kakoki Co., Ltd., Itano, Japan

[21] Appl. No.: 130,504

[22] Filed: Oct. 1, 1993

[30] Foreign Application Priority Data

Oct. 1, 1992 [JP] Japan .................. 4-263520

[51] Int. Cl.$^6$ .............................................. B65B 31/00
[52] U.S. Cl. .................................... 53/510; 53/565; 53/370.9
[58] Field of Search .............. 53/565, 370.4, 370.8, 53/266.1, 127, 111, 511, 510, 431, 432, 433, 440; 141/69, 82

[56] References Cited

U.S. PATENT DOCUMENTS

| | | |
|---|---|---|
| 2,328,372 | 8/1943 | Wollenbeber . |
| 2,377,796 | 6/1945 | McKinnis . |
| 2,380,434 | 7/1945 | Heinle . |
| 2,398,189 | 4/1946 | Monroe ................... 141/82 |
| 2,752,083 | 6/1956 | Ullman et al. . |
| 3,169,561 | 2/1965 | Berger et al. ............. 141/69 |
| 3,837,137 | 9/1974 | Yatsushiro et al. ........ 53/432 |
| 4,295,502 | 10/1981 | Matzner ................... 141/69 |
| 4,448,008 | 5/1984 | Pankratz et al. .......... 53/565 |
| 4,602,473 | 7/1986 | Hayashi et al. ........... 53/432 |
| 4,827,696 | 5/1989 | Arends et al. ............ 53/432 |
| 5,038,548 | 8/1991 | Sieg ....................... 53/431 |

Primary Examiner—John Sipos
Assistant Examiner—Gene L. Kim
Attorney, Agent, or Firm—Armstrong, Westerman, Hattori, McLeland & Naughton

[57] ABSTRACT

A packaging machine having a filling device, a top breaker, a top heater and a top sealer which are arranged along a path of transport of containers. A hot air applicator is disposed between the filling device and the top breaker for eliminating the froth to be produced when containers, each having an upward opening, are filled with contents. The applicator includes a hot air discharge box having a bottom wall, a top wall, a side wall and two air outlets formed in the bottom wall, the air outlets being arranged along the transport path so as to be opposed to the openings of containers from above, and means for supplying hot air to the box. Each of the outlets is covered with a perforated plate, and has an edge portion provided with a downwardly extending annular portion for preventing the hot air from spreading out.

2 Claims, 4 Drawing Sheets

PACKAGING MACHINE

BACKGROUND OF THE INVENTION

The present invention relates to packaging machines, and more particularly to a machine for filling a fluid food or similar contents into tubular containers having a bottom and thereafter closing all upper end portion of each container to form a top portion thereof and complete a sealed container as filled with the contents.

Packaging machines are known which comprise, as arranged along a path of transport, a filling device for filling a specified amount of contents into tubular containers having a bottom, a top breaker for folding an upper end portion of the filled container, a top heater for heating the folded end portion, and a top sealer for bonding the end portion under pressure.

Some kinds of coffee, juice, milk, etc. are liable to froth. When such a liquid is discharged from the filling nozzle, the impact of fall onto the bottom of the container and a continuous increase in the amount of liquid in the container to the specified quantity to be filled agitate the contents to produce froth.

If a large amount of froth is produced, the froth will be forced out from the upper end of the container, making it difficult for the top breaker to fold the container upper end portion. Another problem commonly encountered is that the top sealer fails to seal off the end portion properly due to the adhesion of froth to the top portion.

Accordingly, when the fluid to be filled has properties to readily froth, frothing is prevented by reducing the rate of discharge from the nozzle or pushing up the container to reduce the fall of the fluid to be filled.

However, the conventional packaging machine described has the problem that if the discharge from the nozzle is slowed down to prevent frothing, the filling time becomes longer. Even if it is attempted to diminish the fall of the fluid to be filled by lifting the container, the amount of lift of the container is limited.

SUMMARY OF THE INVENTION

An object of the present invention is to provide a packaging machine which is adapted to destroy the froth to be produced within containers during filling.

The present invention provides a packaging machine having a filling device, a top breaker, a top heater and a top sealer which are arranged along a path of transport of containers, the packaging machine being characterized in that a hot air applicator is disposed between the filling device and the top breaker for eliminating the froth to be produced when containers each having an upward opening are filled with contents.

The hot air applicator, which is provided between the filling device and the top breaker, applies hot air to the froth formed during filling, with the result that the expansion of air inside the bubble, evaporation of water on the surface of bubbles and pressure of the hot air destroy the bubbles regardless of the size of bubbles formed. Furthermore, the defoaming hot air heats the upper end portion of the container.

Accordingly, when the top breaker operates to fold the top portion, the amount of froth relative to the volume of air inside the container has diminished, so that the top portion is foldable easily without forcing out the froth from the upper end of the container. This obviates the likelihood that the top sealer is unable to seal off the container properly if the froth thrown out adheres to the top portion. Moreover, when the folded end portion is to be heated by the top heater, it is possible to lower the heating temperature or shorten the boating time because the container end portion is heated with the hot air.

The hot air applicator comprises a hot air discharge box having a bottom wall $18a$, a top wall $18b$, a side wall $18c$ and two air outlets 19 formed in the bottom wall $18a$, the air outlets being arranged along tile transport path so as to be opposed to the openings of containers C from above, and means for supplying hot air to the box, 18 whereby hot air is forced against two containers simultaneously which containers are arranged adjacent to each other in the direction of transport.

Preferably, the hot air is controlled to a temperature of 100° to 250° C.

Preferably, the air outlets are square to rectangular in shape and smaller than the opening of the container.

Each of the air outlets has an edge portion provided with a downwardly extending annular portion for preventing the hot air from spreading out.

Preferably, the air outlet is covered with a perforated plate.

The perforated plate has holes in a staggered arrangement.

The provision of the spreading-out preventing annular portion and the perforated plate prevents turbulence in the flow of her air, permitting the hot air to be forced into the container in a laminar flow.

The side wall of the hot air discharge box may be formed with a slit positioned at the same level as the upper surface of the bottom wall. The perforated plate is inserted through the slit and bears on the upper surface of the bottom wall.

A bolt extends through the top wall of the discharge box in screw-thread engagement therewith and has a forward end pressing the perforated plate against the bottom wall of the box.

DESCRIPTION OF THE PREFERRED EMBODIMENT

An embodiment of the present invention will be described below with reference to time drawings. The terms "front" and "rear" as used in the following description are based on FIG. 1; the left-hand side of this drawing will be referred to as the front, and the right-hand side thereof as the rear.

The packaging machine to be described below comprises two rows of devices. These two rows are identical with respect to the component devices.

Figure 1:
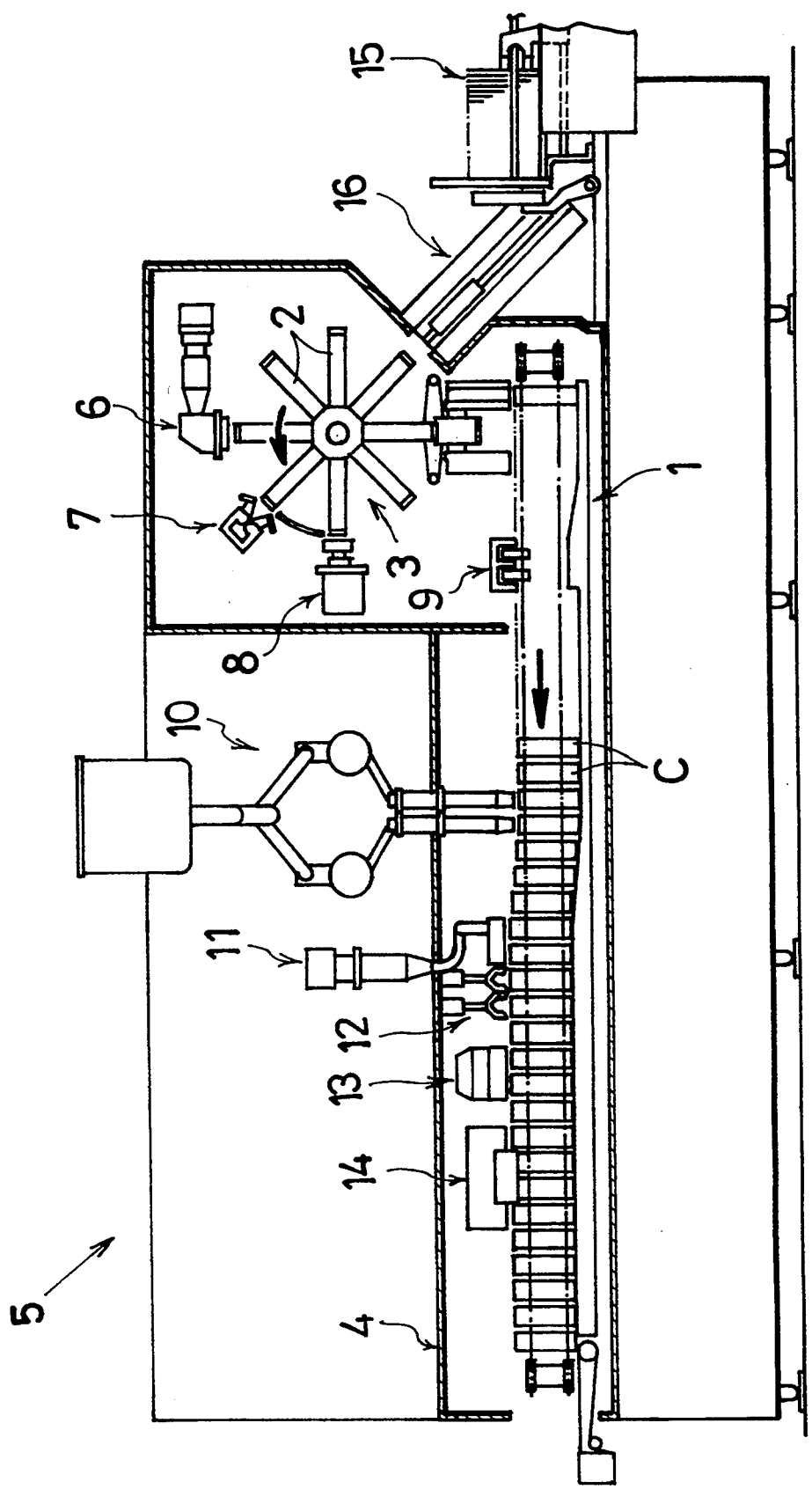
FIG. 1 is a side elevation of a packaging machine embodying the invention.
Figure 2:
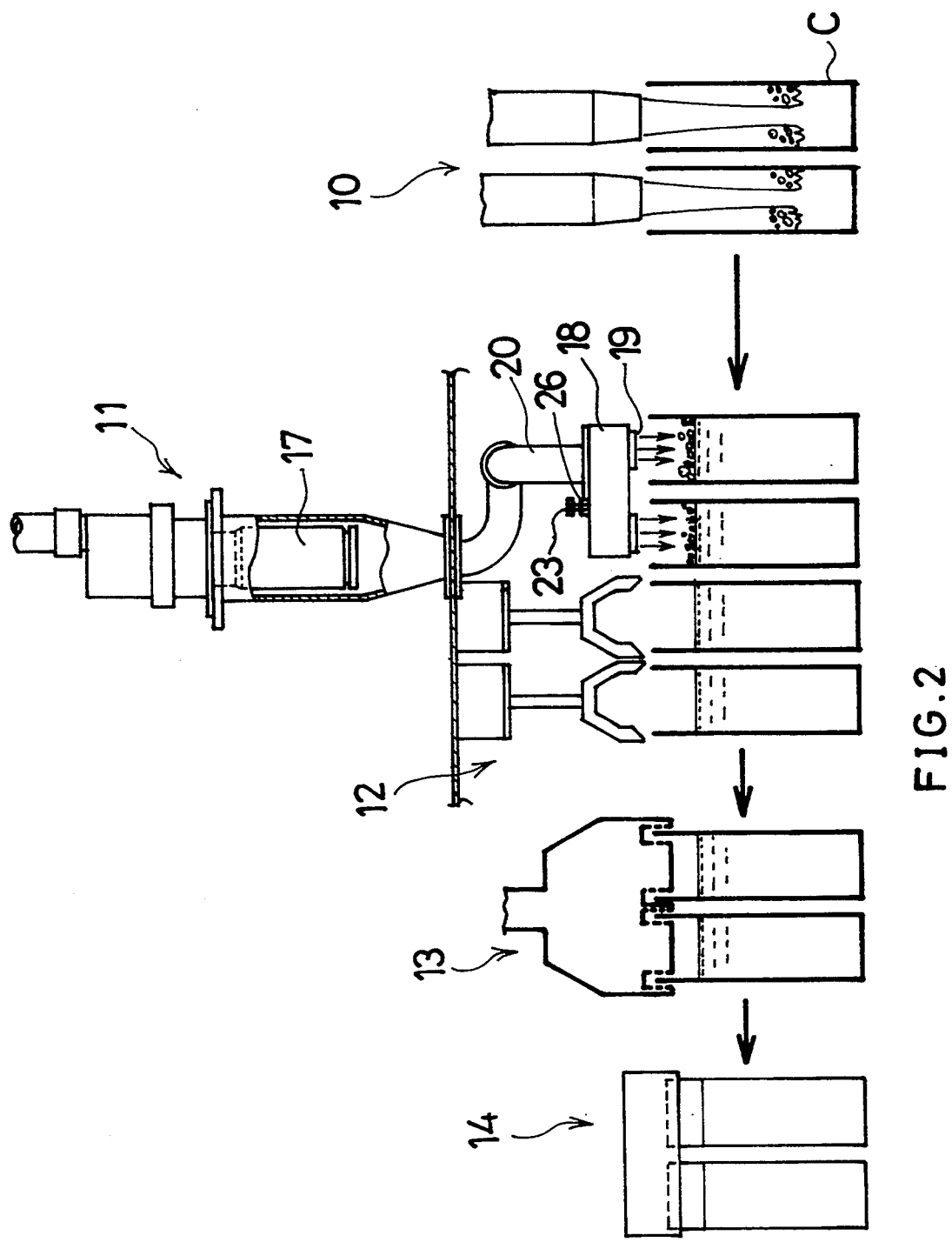
FIG. 2 is an enlarged fragmentary side elevation of the same.
Figure 3:
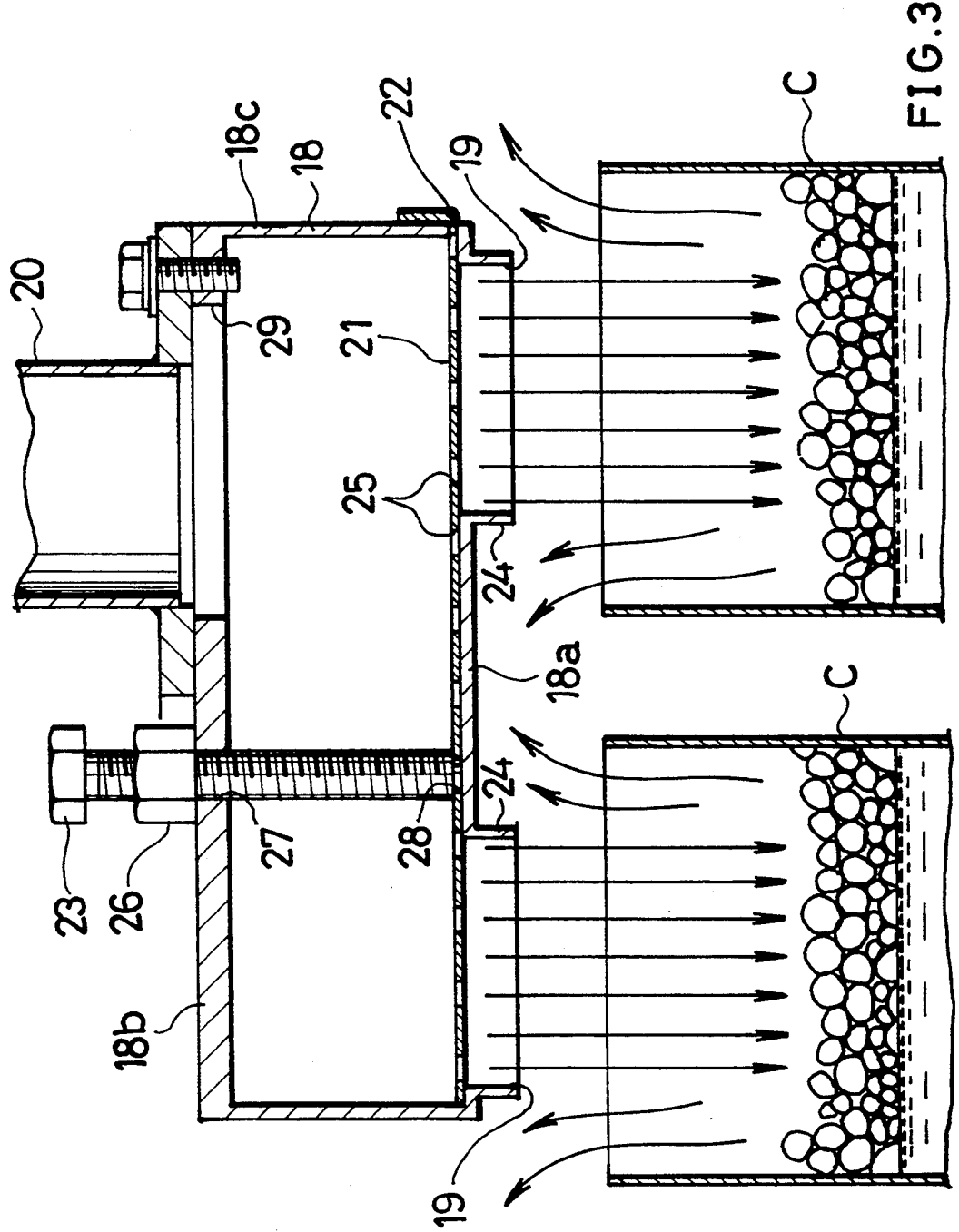
FIG. 3 is an enlarged fragmentary side elevation of a hot air applicator.
Figure 4:
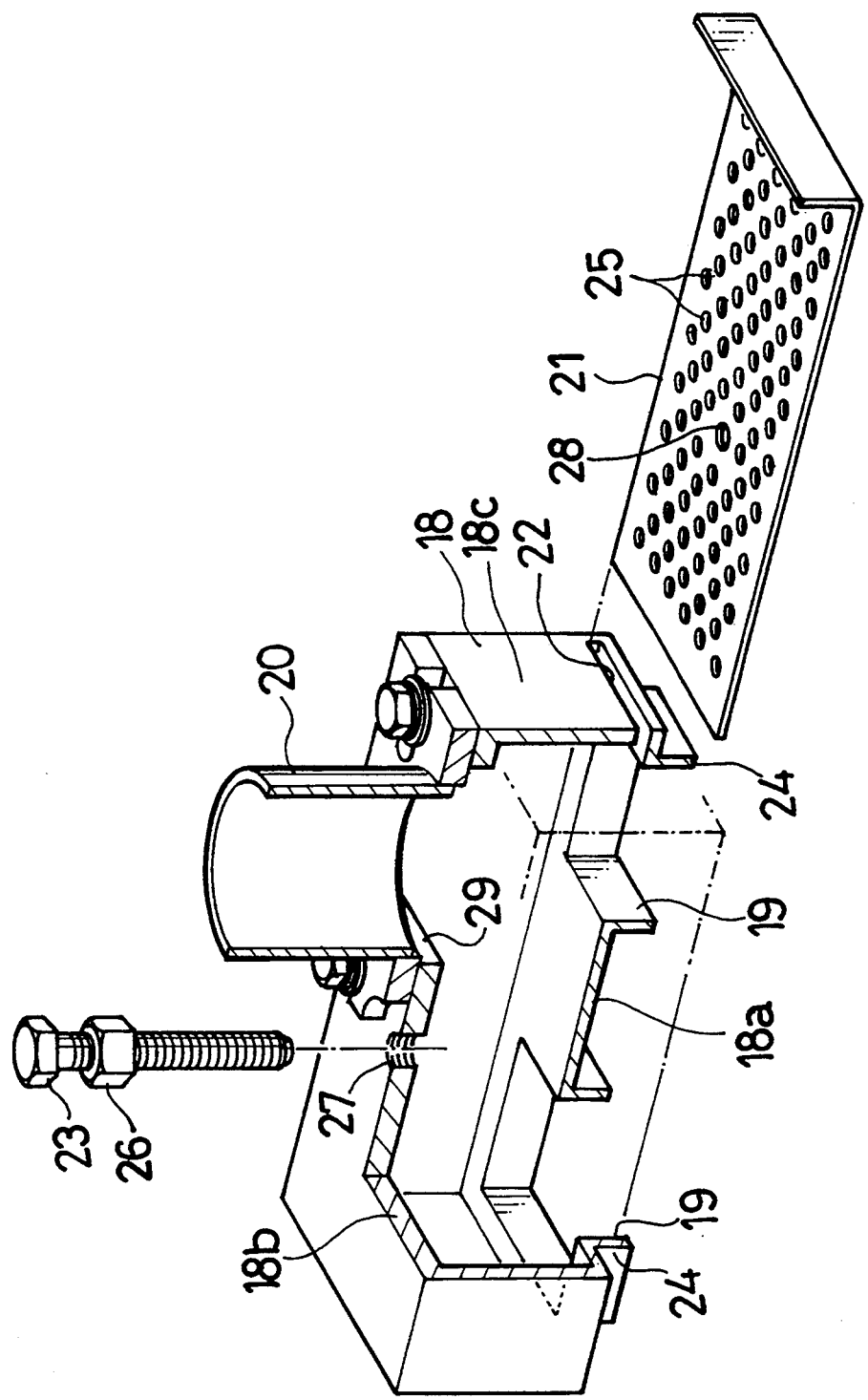
FIG. 4 is an exploded fragmentary perspective view of the hot air applicator.

With reference to FIG. 1, the packaging machine comprises an endless conveyor 1, and a rotor 3 disposed above the starting end of a path of transport provided by the conveyor 1 and having a horizontal rotary shaft and eight mandrels 2 extending radially from the shaft. The conveyor 1 and the rotor 3 are intermittently driven in synchronism. The conveyor 1 and the rotor 3 are entirely enclosed in a closed chamber 4. The chamber 4 has a top wall, on which a group 5 of devices are arranged from the rear toward the front in series. The devices of the group 5 are, as arranged from the rear forward, a bottom heater 6 for heating an end portion of a tubular container C having a square to rectangular cross section which portion is to be made into the bottom of the container, a bottom breaker 7 for folding the end portion flat, a bottom sealer 8 for bonding the folded end portion under pressure, a primary top breaker 9 for forming scores in the other end portion of the container C to be made into the top portion thereof so as to make the end portion easily foldable to the shape of a roof, a filling device 10 for filling a specified amount of contents into the container C, a hot air applicator 11 for eliminating froth to be produced in the container C during filling, a secondary top breaker 12 for folding the end portion along the scores formed by the primary top breaker 9 and eventually folding the end portion to the roof shape, a top heater 13 for heating the end portion thus folded, and a top sealer 14 for bonding the heated end portion under pressure. In the device group 5, the bottom heater 6, bottom breaker 7 and bottom scaler 8 are arranged in corresponding relation with positions where the mandrels are stopped. The primary top breaker 9, filling device 10, hot air applicator 11, secondary top breaker 12, top heater 13 and top sealer 14 are adapted to work on two containers C at the same time which containers are adjacent to each other as arranged in the direction of transport of containers. Containers C are supplied to the rotor 3 by a container feeder 15 and a transfer device 16 which are arranged in the rear of the chamber 4.

The hot air applicator 11 which is adapted to destroy froth comprises a hot air discharge box 18 having a bottom wall 18a, a top wall 18b, a side wall 18c and two air outlets 19 formed in the bottom wall 18a, the air outlets being arranged along the transport path so as to be opposed to the openings of containers C from above, and means for supplying hot air to the box 18. The hot air supplying means comprises an electric heater 17 for heating air taken in by an electric fan (not shown), and an air pipe 20 for sending the air heated by the heater 17 to the box 18.

The top wall 18b of the air discharge box 18 is formed in its rear half with an air intake 29. The air pipe 20 has one end connected to the wall edge portion defining the opening 29. Each air outlet 19 is square to rectangular and smaller than the opening of the tubular container C having a bottom. The air outlets 19 are covered with a perforated plate 21 having a multiplicity of small holes 25 in a staggered arrangement, The holes 25 of the perforated plate 21 are, for example, 4 mm in diameter, and the hole pitch is 7 mm. The rear portion of the side wall 18c of the box 18 is formed with a slit 22 which is positioned at the same level as the upper surface of the bottom wall 18a. The perforated plate 21 is inserted into the box 18 through the slit 22 and bears on the upper Surface of the bottom plate 18a while covering the two outlets 19, The plate. 19 is fixed to the box 18 by a bolt 23 and a nut 26. More specifically, a screw hole 27 is formed in the top wall 18b of the box 18 at an intermediate portion of its length other than the air intake portion 29. A through hole 28 for the forward end of the bolt 23 to fit in is formed in the perforated plate 19 at an intermediate portion of its length which is not opposed to the air outlet 19. The bolt 23 with the nut 26 screwed thereon is inserted through the top wall 18b of the box 18 from above, and the nut 26 is tightened up in pressing contact with the top wall 18b with the bolt end fitting in the through hole 28, whereby the perforated plate 19 is fastened to the box 18. Each air outlet 19 has a an edge portion provided with a downwardly extending portion 24 for preventing the hot air from spreading out. Disposed below the heater 17 is a thermocouple or like temperature sensor (not shown) for use in controlling the temperature of the heater 17 to a suitable level. The degree of cleanness of the hot air is adjusted in accordance with the contents and the surrounding environment.

With the defoaming hot air applicator 11, hot air heated to 100° to 250° C. by the electric heater 17 reaches the hot air discharge box 18, and is made into a laminar flow by the perforated plate 21 and hot air spreading-out preventing portion 24 provided on the box 18 and forces into the container C which is filled with the contents. Since the outlet 19. is smaller than the opening of the container C, the hot air does not strike against the side wall of the container C but comes into direct contact with froth formed on the surface of the contents to destroy the froth irrespective of the size of bubbles formed by virtue of the expansion of air inside the bubbles, evaporation of water on the surface of bubbles and pressure of the hot hair. After eliminating the froth, the hot air rises along the inner surface of side wall of the container C and flows out from the container C. At this time, the upper end portion of the container C is heated.

After the application of hot air, the secondary top breaker 12 folds the container top portion, the top heater 13 heats the folded end portion and the top sealer 14 seals off the top portion. The top portion can be folded with ease since no froth is forced out from the tupper end of the container C, while the heating operation can be effected at a lower temperature or for a shorter period of time. The sealing operation can be conducted without the likelihood of impairing the seal owing to the adhesion of through-out froth to the top portion.

Although the holes 25 of the perforated plate 21 are 4 mm in diameter and arranged with a pitch of 7 mm according to the embodiment described, the diameter and pitch of the holes 25 are suitably variable, for example, in accordance with the contents to be filled into containers C.

What is claimed is:

1. A packaging machine having a filling device, a top breaker, a top heater and a top sealer which are arranged along a path of transport of containers, the packaging machine comprising a hot air applicator disposed between the filling device and the top breaker for eliminating the froth to be produced when containers each having an upward opening are filled with contents, an air outlet of the hot air applicator being covered with a perforated plate;

wherein the hot air applicator comprises a hot air discharge box having a bottom wall, a top wall, a side wall and at least one air outlet formed in the bottom wall so as to be opposed to the opening of the container from above, and means for supplying hot air to the box; and wherein a side wall of the hot air discharge box has a slit at the same level as the upper surface of the bottom wall, and the perforated plate is inserted through the slit and bears on the upper surface of the bottom wall.

2. A packaging machine as defined in claim 1 wherein a bolt extends through the to wall of the hot air discharge box in screw-thread engagement therewith and has a forward end pressing the perforated plate against the bottom wall of the box.

* * * * *